(12) United States Patent
Araki

(10) Patent No.: US 8,331,437 B2
(45) Date of Patent: Dec. 11, 2012

(54) CODING APPARATUS, CODING METHOD, CODING PROGRAM AND RECORDING MEDIUM

(75) Inventor: Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 1799 days.

(21) Appl. No.: 11/502,300

(22) Filed: Aug. 10, 2006

(65) Prior Publication Data

US 2007/0036214 A1    Feb. 15, 2007

(30) Foreign Application Priority Data

Aug. 11, 2005    (JP) .................. 2005-233573

(51) Int. Cl.
*H04N 7/12* (2006.01)
*H04N 11/02* (2006.01)
*H04N 11/04* (2006.01)

(52) U.S. Cl. .................. 375/240.03; 348/405; 348/414; 348/417; 348/418; 348/419; 382/251; 704/222

(58) Field of Classification Search .................. 375/240.01–240.29; 382/251; 382/250; 715/500.1; 370/229; 348/405, 348/414, 417, 418, 419, 422; 704/222, 230
See application file for complete search history.

(56) References Cited

U.S. PATENT DOCUMENTS

| 5,721,589 | A  | * | 2/1998  | Murata ............... | 375/240.18 |
| 6,658,161 | B1 | * | 12/2003 | Chen et al. ............ | 382/250 |
| 2002/0118753 | A1 | * | 8/2002 | Kawashima ........... | 375/240.13 |
| 2003/0016878 | A1 | * | 1/2003 | Motosu et al. ......... | 382/251 |
| 2003/0031128 | A1 | * | 2/2003 | Kim et al. ............. | 370/229 |
| 2006/0129909 | A1 | * | 6/2006 | Butt et al. ............. | 715/500.1 |

FOREIGN PATENT DOCUMENTS

| JP | 10 191343 | | 7/1998 |
| JP | 10191343 | A * | 7/1998 |
| WO | WO 96 28937 | | 9/1996 |

* cited by examiner

*Primary Examiner* — Sath V Perungavoor
*Assistant Examiner* — Nathnael Aynalem
(74) *Attorney, Agent, or Firm* — Frommer Lawrence & Haug LLP; William S. Frommer

(57) ABSTRACT

Searching an optimal quantization step size at high speed when controlling the coding rate of an image sequence. A skip binary search section determines quantization step size $\Delta_{skip}$ by binary search, using a frame out of every m [0] frames of an image sequence. A quantization step size correcting section determines quantization step size $\Delta_a$ that can achieve the target bit rate R by linear approximation from $\Delta_{skip}$, generated bit rate at that time, quantization step size $\Delta_{last}$ of the immediately preceding loop and the generated bit rate at that time. A first coding section encodes the every m [1]-th frame of the image sequence with quantization step size $\Delta_a$ and a quantization step size forecasting section determines quantization step size $\Delta_e$ that can achieve the target bit rate R by linear approximation. A second coding section encodes all the frames with the quantization step size $\Delta_e$.

11 Claims, 9 Drawing Sheets

CODING APPARATUS, CODING METHOD, CODING PROGRAM AND RECORDING MEDIUM

CROSS REFERENCES TO RELATED APPLICATIONS

The present invention contains subject matter related to Japanese Patent Application JP 2005-233573 filed in the Japanese Patent Office on Aug. 11, 2005, the entire contents of which being incorporated herein by reference.

BACKGROUND OF THE INVENTION

1. Field of the Invention

The present invention relates to a coding apparatus, a coding method and a coding program for controlling the coding rate of an image sequence and also to a recording medium storing such a program.

2. Description of the Related Art

Known rate control techniques that can be used for encoding an image sequence according to a bit plane coding system include rate control that utilizes truncation of cutting off the coding path so as to achieve a target bit rate after coding and multi-loop rate control of controlling the coding rate only by means of the quantization step size given before coding.

The former technique has a short processing time because it is possible to accurately control the coding rate by a single coding operation. On the other hand, since a constant coding rate is assigned to frames, the image quality can vary significantly from frame to frame to consequently degrade the image quality as a whole particularly when the degree of coding facility varies among frames. The latter technique has a small dispersion and a good image quality because a high coding rate is assigned to frames showing a low degree of coding facility while a low coding rate is assigned to frames showing a high degree of coding facility. On the other hand, since it is not possible to know the relationship between the quantization step size and the generated bit rate before coding and hence it is necessary to search for an optimal quantization step size by repeatedly coding all the frames in order to accurately control the coding rate. In short, this technique involves a time consuming process.

While the two techniques have respective advantages and disadvantages, the multi-loop rate control technique is preferable when non-linearly pursuing a high image quality as in the case of digital cinema.

Meanwhile, binary search (binary tree search) is a popular technique for searching for an optimal quantization step size for multi-loop plate control (see Patent Document 1: Jpn. Pat. Appln. Laid-Open Publication No. H. 10-191343). Binary search involves the use of an algorithm for searching for a target value from sorted data. With binary search, the range of search is divided into two at an intermediate point to see which one includes the target value and the range of search that includes the target value is divided into two at an intermediate point. This process is repeated until the target value is located. The quantization step size and the generated bit rate show such a relationship that the generated bit rate falls as the quantization step size increases so that the target value can be regarded as sorted data and hence the technique of binary search can feasibly be employed.

FIG. 1 of the accompanying drawings shows a flowchart of the sequence for searching for an optimal quantization step size by means of binary search. Note that the largest value and the smallest value of the range of search of the quantization step size are respectively expressed by $\Delta max$ and $\Delta min$ whereas the generated bit rate when the quantization step size is A and the target bit rate are respectively R ($\Delta$) and R and the threshold value to be used for determining to cut off the loop is Th.

Referring to FIG. 1, firstly in Step S21, the average value of the largest value $\Delta max$ and the smallest value $\Delta min$ of the range of search is defined as quantization step size $\Delta$. In Step S22, all the frames of the image sequence are coded with the quantization step size $\Delta$ to determine the generated bit rate R ($\Delta$).

Then, in Step S23, it is determined if the absolute value of the difference between the target bit rate R and the generated bit rate R ($\Delta$) is less than the threshold value Th or not and, if it is not less than the threshold value Th, it is determined in Step S24 if the target bit rate R is less than the generated bit rate R ($\Delta$) or not. $\Delta$ is set as $\Delta min$ in Step S25 when the target bit rate R is less than the generated bit rate R ($\Delta$) and the processing operation returns to Step S21, whereas $\Delta$ is set as $\Delta max$ when the target bit rate R is more than the generated bit rate R ($\Delta$) and the processing operation returns to Step S21.

On the other hand, the process simply ends if it is determined in Step S23 that the absolute value of the difference between the target bit rate R and the generated bit rate R ($\Delta$) is less than the threshold value Th.

SUMMARY OF THE INVENTION

Thus, it is possible to reliably determine an optimal quantization step size by means of binary search. However, it is necessary to encode all the frames 5 to 10 times in a rate control operation for the purpose of achieving a practically feasible level of accuracy. Then, the processing time will be very long. Therefore, there is a demand for a method of searching for an optimal quantization step size at high speed.

In view of the above-identified circumstances, it is desirable to provide a coding apparatus, a coding method, a coding program that can search for an optimal quantization step size at high speed when controlling the coding rate of an image sequence as well as a recording medium storing such a program.

According to an embodiment of the present invention, there is provided a coding apparatus for coding an image sequence of a plurality of frames, the apparatus including: a skip binary search means for coding a frame out of every first skip number of frames of the image sequence, while changing the quantization step size according to a binary search algorithm, and determining a quantization step size with which the generated bit rate is approximate to the target bit rate; a quantization step size correction means for determining the quantization step size good for achieving the target bit rate by using an approximate straight line expressing the relationship of the quantization step size determined by the skip binary search means and the generated bit rate; a first coding means for coding a frame out of every second skip number of frames of the image sequence with the quantization step size corrected by the quantization step size correction means; a quantization step size forecasting means for determining the quantization step size good for achieving the target bit rate by using the generated bit rate generated by the first coding means; and a second coding means for coding all the frames of the image sequence with the quantization step size forecast by the quantization step size forecasting means.

According to an embodiment of the present invention, there is also provided a coding method of coding an image sequence of a plurality of frames, the method including: a skip binary search step of coding a frame out of every first skip number of frames of the image sequence, while changing the quantization step size according to a binary search algorithm, and determining a quantization step size with which the generated bit rate is approximate to the target bit rate; a quantization step size correction step of determining the quantization step size good for achieving the target bit rate by using an approximate straight line expressing the relationship of the quantization step size determined in the skip binary search step and the generated bit rate; a first coding step of coding a frame out of every second skip number of frames of the image sequence with the quantization step size corrected in the quantization step size correction step; a quantization step size forecasting step of determining the quantization step size good for achieving the target bit rate by using the generated bit rate generated in the first coding step; and a second coding step of coding all the frames of the image sequence with the quantization step size forecast in the quantization step size forecasting step.

According to an embodiment of the present invention, there is also provided a program for causing a computer to execute the coding processing and a recording medium having recorded therein the program.

Thus, according to a coding apparatus, a coding method, a coding program as well as a recording medium storing such a program of the present invention, it is possible to search for an optimal quantization step size at high speed when controlling the coding rate of an image sequence by means of quantization step size.

DETAILED DESCRIPTION OF THE PREFERRED EMBODIMENTS

Now, embodiments of the present invention will be described in greater detail by referring to the accompanying drawings. The illustrated embodiments are coding apparatus for controlling the coding rate of an image sequence according to a bit plane coding system by means of a coding method.

(First Embodiment)

Figure 1:
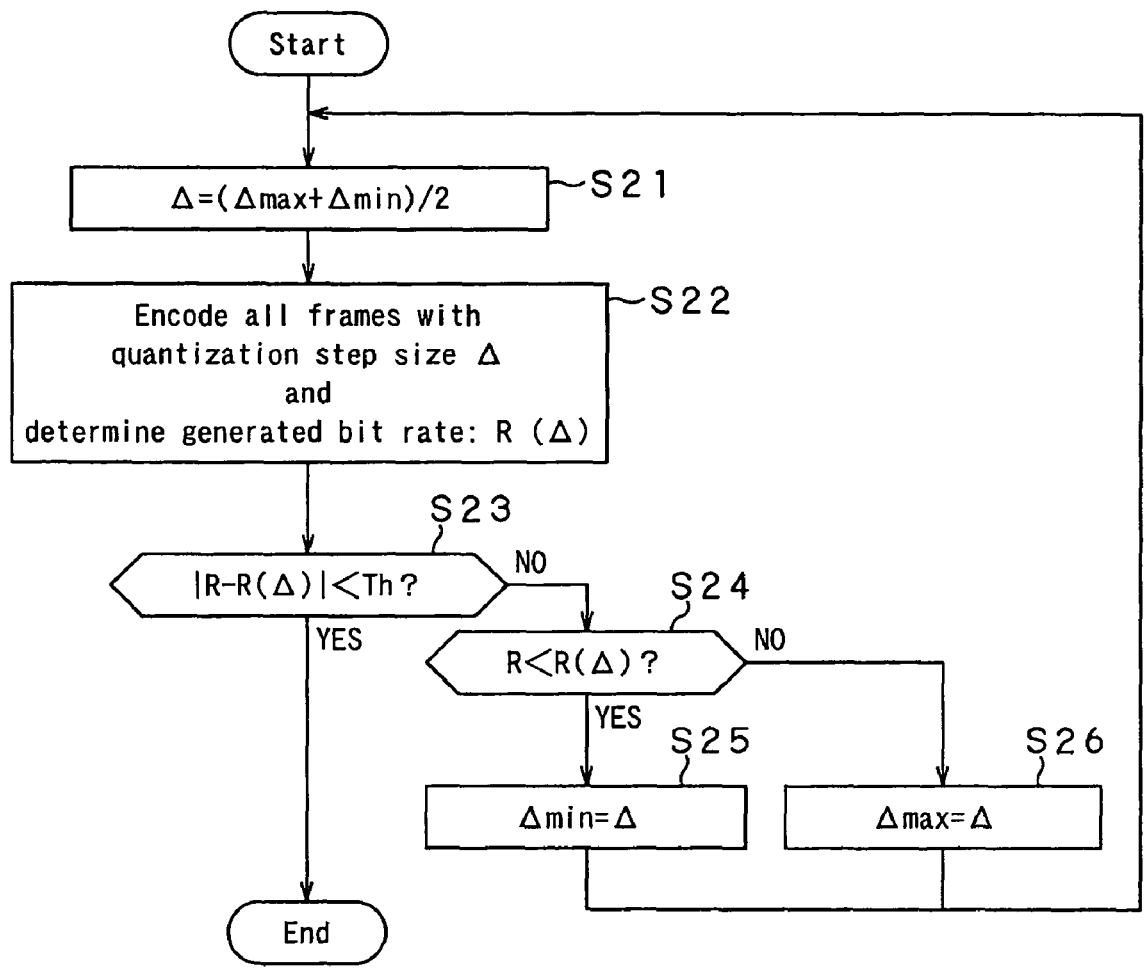
FIG. 1 is a flowchart of the sequence of operation for searching an optimal quantization step size by means of a binary search technique.
Figure 2:
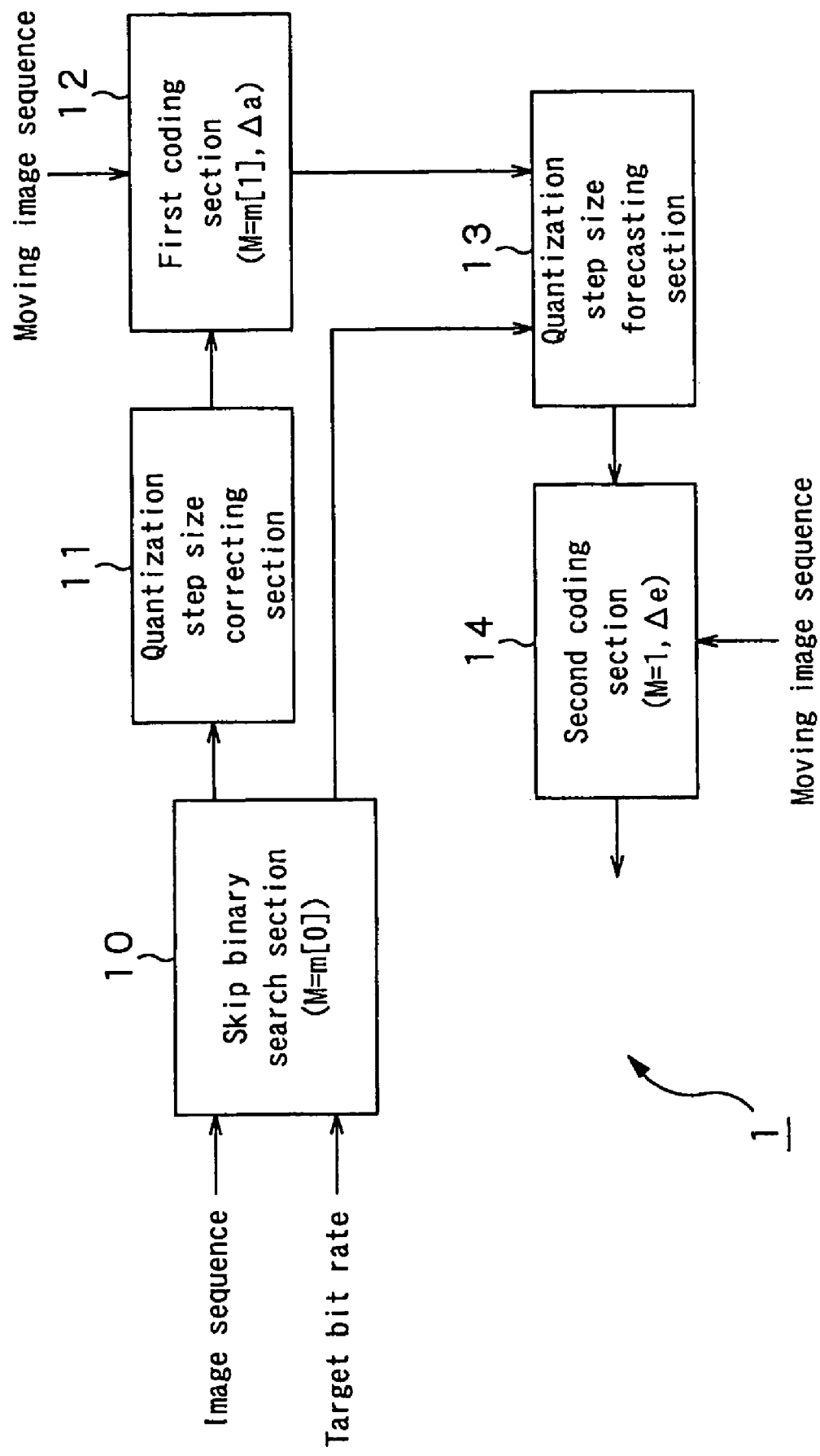
FIG. 2 is a schematic block diagram of a coding apparatus according to the first embodiment of the present invention, illustrating the configuration thereof.

FIG. 2 is a schematic block diagram of a coding apparatus according to the first embodiment of the present invention, illustrating the configuration thereof. Referring to FIG. 2, the coding apparatus 1 includes a skip binary search section 10, a quantization step size correcting section 11, a first coding section 12, a quantization step size forecasting section 13 and a second coding section 14.

Figure 3:
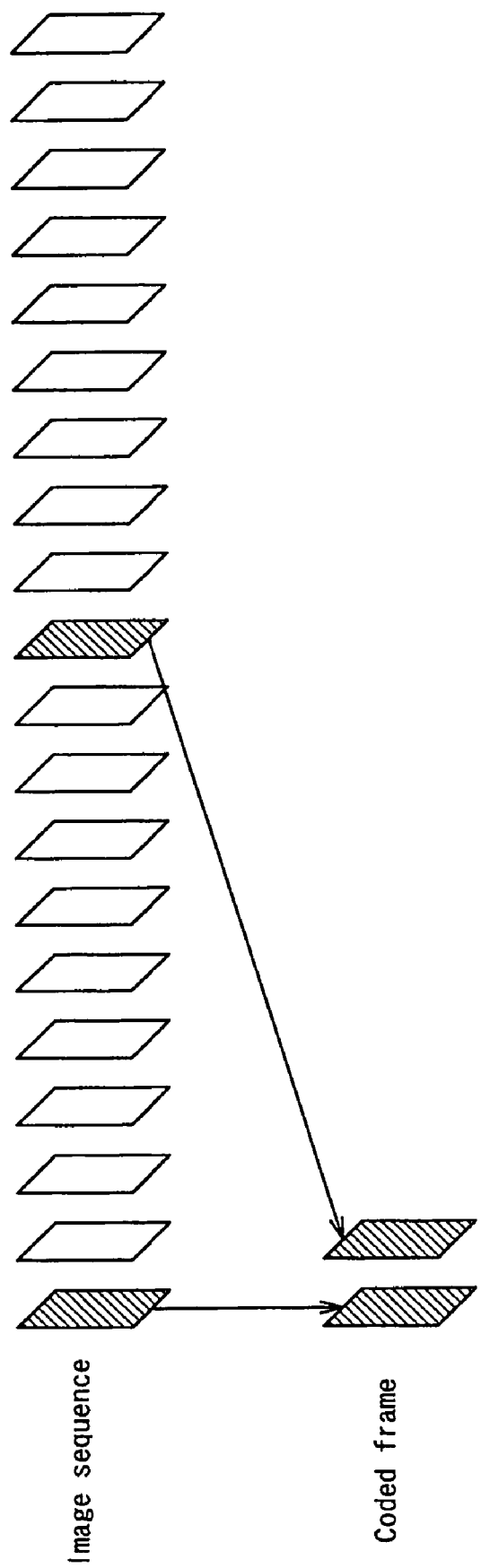
FIG. 3 is a schematic illustration of the number of skip frames selected by the skip binary search section of the coding apparatus of FIG. 2.

The skip binary search section 10 receives as input an image sequence of (n+1) frames (In [0] through In [n]) and a target bit rate (R [bpp]). Then, the skip binary search section 10 encodes the frames selected by using the number of skip frames M of the image sequence and keeps on encoding, changing the quantization step size according to a binary search algorithm, to determine a quantization step size Δskip with which the generated bit rate is approximate to the target bit rate R. The number of skip frames M indicates that every M-th frame of the image sequence is encoded. For example, when the total number of frames is 20 and M=10, the skip binary search section 10 encodes only the shaded two frames in FIG. 3 for binary search. With this arrangement, the processing time necessary for binary search is reduced to about 1/M.

Figure 4:
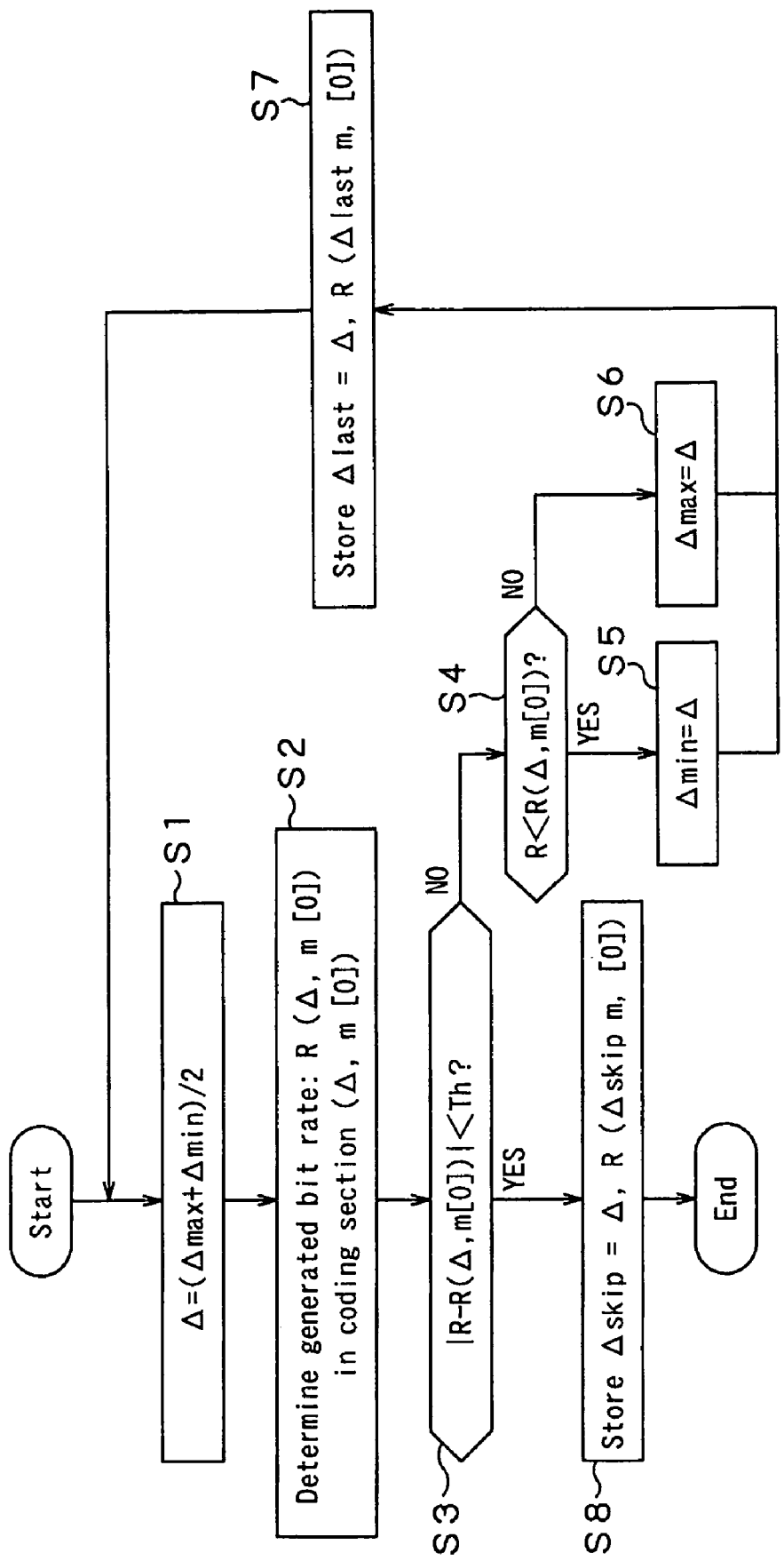
FIG. 4 is a flowchart of the processing sequence of the skip binary search section of FIG. 3.

Now, the processing sequence of the skip binary search section 10 will be described below by referring to the flowchart of FIG. 4. Here, the largest value and the smallest value of the range of search of the quantization step size are respectively expressed by Δmax and Δmin whereas the generated bit rate when the quantization step size is A and the number of skip frames is M=m is R (Δ, m), the target bit rate is R and the threshold value to be used for determining to cut off the loop is Th. The range of search is sufficiently large for ordinary quantization step size.

Firstly, in Step S1, the average value of the largest value Δmax and the smallest value Δmin of the range of search is defined as quantization step size Δ. In Step S2, every M-th frame (=m [0]) of the image sequence is coded with the quantization step size Δ to determine the generated bit rate R (Δ, m [0]).

The operation of Step S2 will be described in greater detail by referring to the flowchart of FIG. 5.

Figure 5:
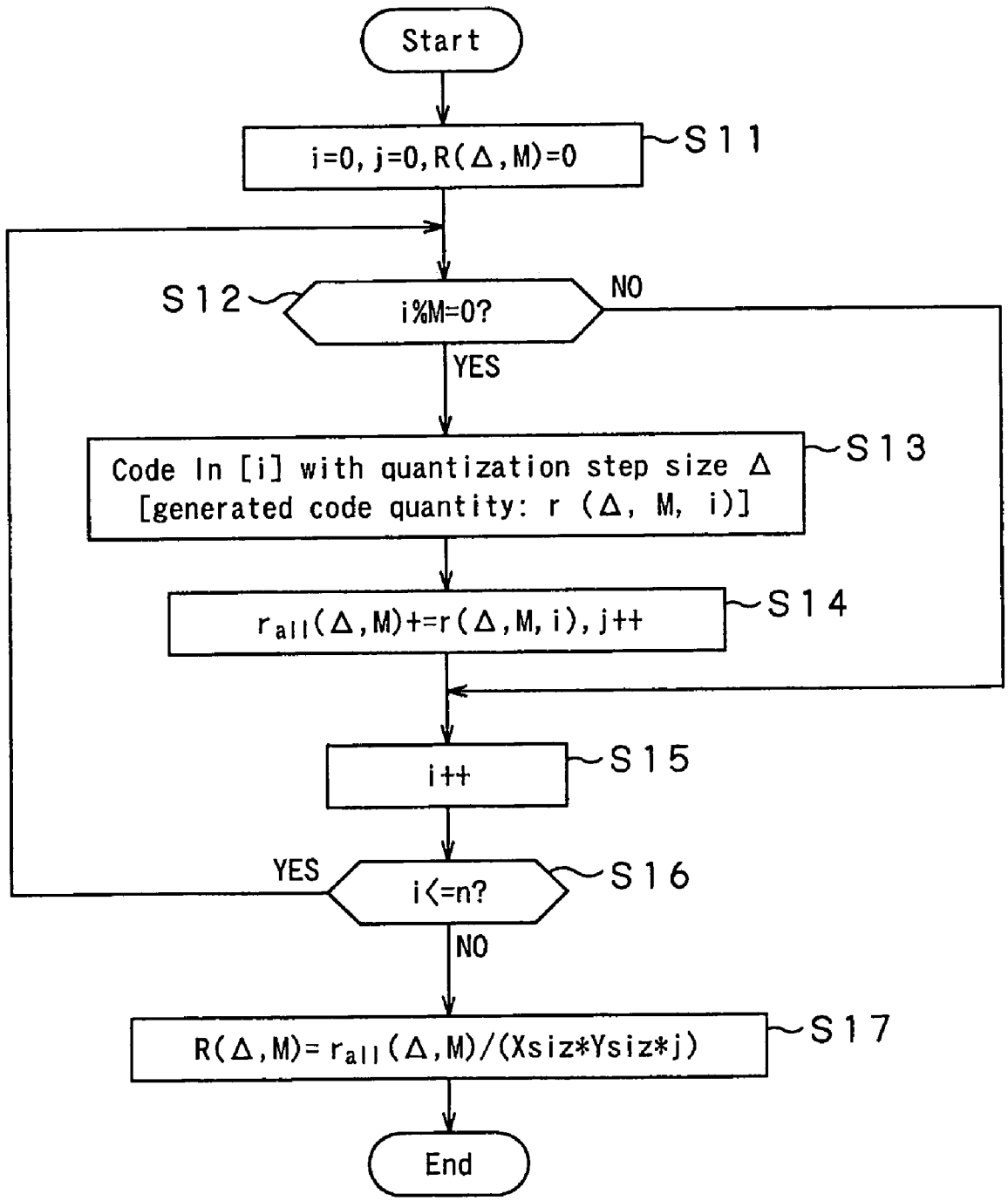
FIG. 5 is a flowchart of the sequence of operation of coding a frame out of every M frames of an image sequence with quantization step size A.

Referring to FIG. 5, firstly, in Step S11, the frame index i, the coding frame number index j and the generated bit rate R (Δ, m) are all initialized to 0 and then, in Step S12, it is determined if the residue of the division of i by M is equal to 0 or not. The operation proceeds to Step S13 when the residue is equal to 0, whereas it proceeds to Step S15 when the residue is not equal to 0.

In Step S13, frame In [i] is coded with the quantization step size Δ. The code quantity that is generated when coding frame In [i] with the quantization step size Δ is expressed by r (Δ, M, i). Subsequently, in Step S14, the code quantity r (Δ, M, i) is added to determine the generated code quantity $r_{all}$ (Δ, M). Ultimately, the generated code quantity $r_{all}$ (Δ, M) becomes equal to the sum of the code quantities r (Δ, M, i) of all the coded frames. In Step S14, the value of j is incremented by 1.

Then, in Step S15, i is incremented by one and, in Step S16, it is determined if the value of i is not more than n or not. The operation returns to Step S12 when the value of i is not more than n, whereas the operation proceeds to Step S17 when the value of i is larger than n. In Step S17, the generated bit rate R (Δ, m) [bpp] is computationally determined from the generated code quantity $r_{all}$(Δ, M) that is determined in Step S14. If the horizontal size and the vertical size of the frame image are Xsize and Ysize respectively, the generated bit rate R (Δ, m) is computationally determined by means of formula (1) shown below.

$$R(\Delta, M) = r_{all}(\Delta, M)/(Xsize * Ysize * j) \quad (1)$$

Returning to FIG. 4, in Step S3, it is determined if the absolute value of the difference between the target bit rate R and the generated bit rate R (Δ, m [0]) is smaller than the threshold value Th or not. If the absolute value is not smaller the threshold value Th, it is determined in Step S4 if the target bit rate R is smaller than the generated bit rate R (Δ, m [0]) or not. When the target bit rate R is smaller than the generated bit rate R (Δ, m [0]), Δmin is set to Δ in Step S5 and the operation proceeds to step S7. On the other hand, the operation proceeds to Step S6, where Δmax is set to Δ, and subsequently to Step S7 when the target bit rate R is not smaller than the generated bit rate R (Δ, m [0]). In Step S7, $\Delta_{last}(=\Delta)$ and R ($\Delta_{last}$, m [0]) are stored and the operation returns to Step S1.

If, on the other hand, it is determined in Step S3 that the absolute value of the difference between the target bit rate R and the generated bit rate R (Δ, m [0]) is not smaller than the threshold value Th, $\Delta_{skip}$ (=Δ) and R ($\Delta_{skip}$, m [0]) are stored to end the processing operation.

The skip binary search section 10 supplies the obtained quantization step size $\Delta_{skip}$, the generated bit rate R ($\Delta_{skip}$, m [0]) at that time, the quantization step size $\Delta_{last}$ in the immediately preceding loop and the generated bit rate R ($\Delta_{last}$, m [0]) at that time to the quantization step size correcting section 11 and the quantization step size forecasting section 13.

Returning now to FIG. 2, the quantization step size correcting section 11 finely adjusts the quantization step size, using $\Delta_{skip}$, R ($\Delta_{skip}$, m [0]), $\Delta_{last}$ and R ($\Delta_{last}$, m [0]) supplied from the skip binary search section 10.

Figure 6:
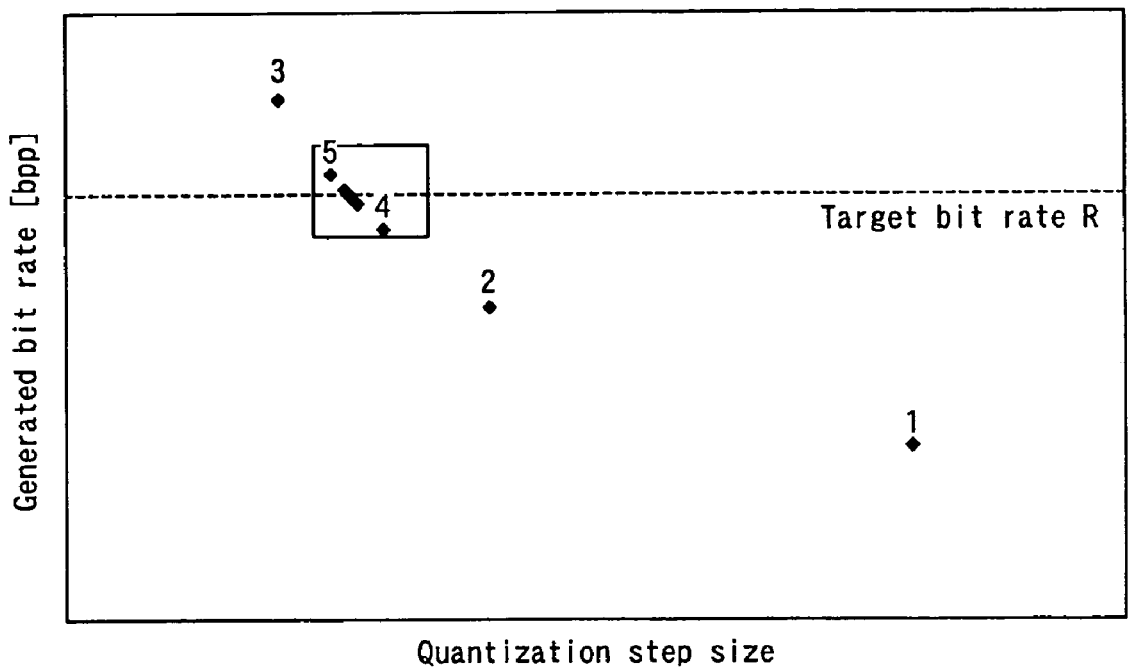
FIG. 6 is a graph illustrating the relationship of the quantization step size and the generated bit rate that can be obtained in a skip binary search operation.
Figure 7:
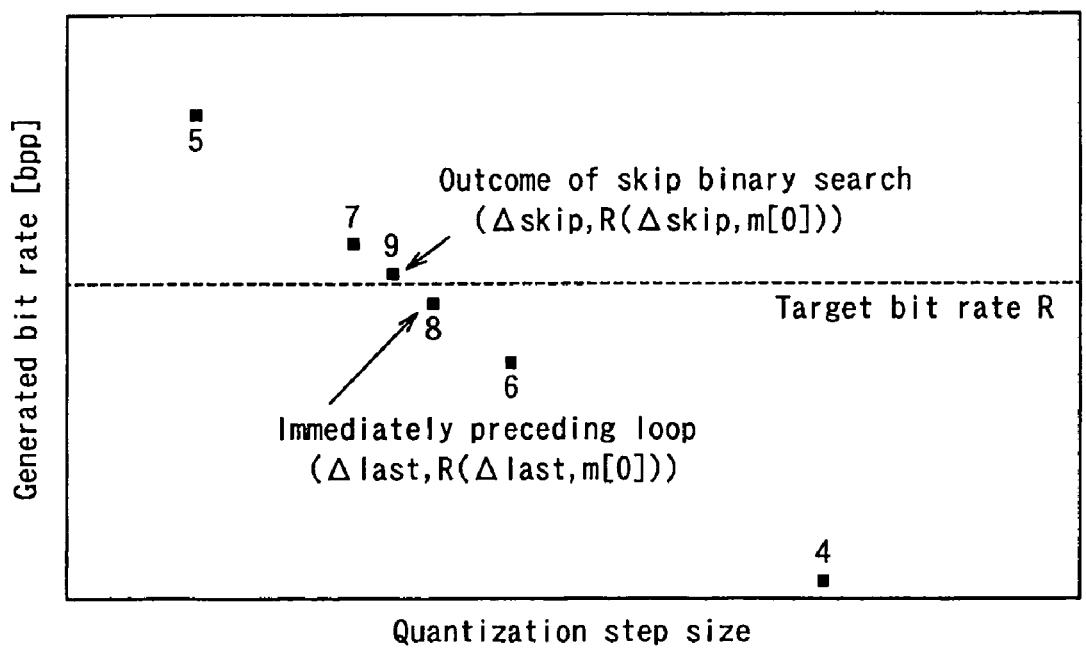
FIG. 7 is an enlarged view of the square in FIG. 6.

FIG. 6 is a graph illustrating the relationship of the quantization step size (horizontal axis) and the generated bit rate (vertical axis) that can be obtained in a skip binary search operation. The relationship of FIG. 6 is obtained when the quantization step size $\Delta_{skip}$ is determined by repeating the loop of FIG. 4 nine times. The numerals in FIG. 6 indicate the coding order that is followed until getting to the quantization step size $\Delta_{skip}$. FIG. 7 is an enlarged view of the square in FIG. 6. As seen from FIG. 7, it is possible to approximate the relationship between the quantization step size and the generated bit rate by means of a straight line within a narrow range. The quantization step size correcting section 11 corrects the quantization step size by utilizing the linearity.

Figure 8:
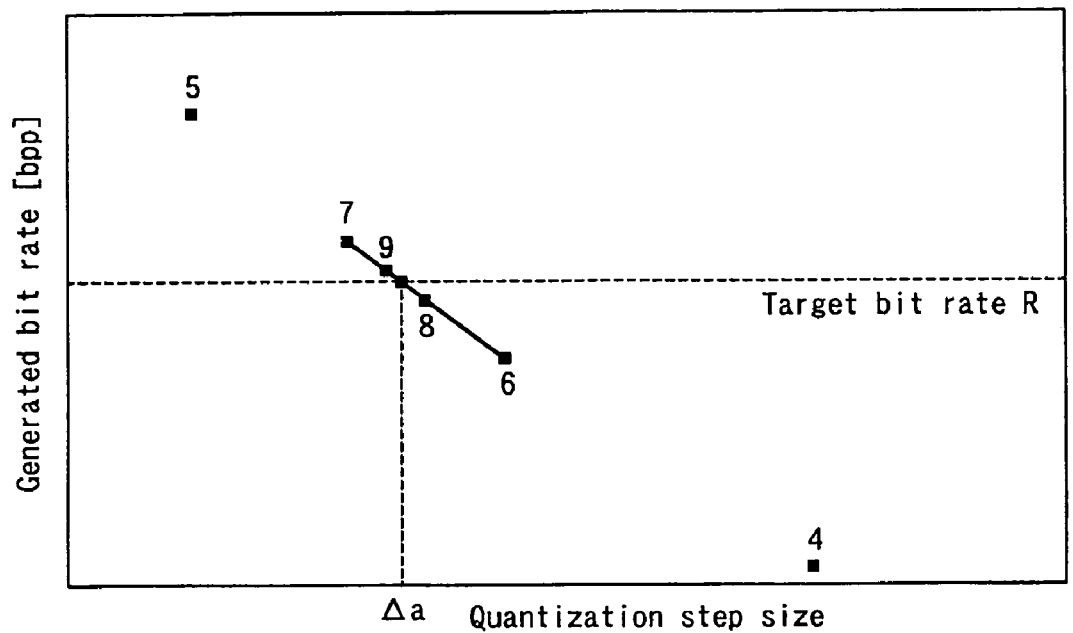
FIG. 8 is a schematic illustration of the operation of determining a quantization step size by the quantization step size correcting section of the coding apparatus of FIG. 2.

More specifically, as shown in FIG. 8, the quantization step size correcting section 11 connects point 9 ($\Delta_{skip}$, R ($\Delta_{skip}$, m [0])) that indicates the outcome of the skip binary search and point 8 ($\Delta_{last}$ and R ($\Delta_{last}$, m [0])) of the immediately preceding loop by a straight line to determine the intersection of the straight line and the target bit rate R and selects the value of the intersection on the horizontal axis as corrected quantization step size $\Delta_a$. The quantization step size correcting section 11 supplies the quantization step size $\Delta_a$ to the first coding section 12.

The first coding section 12 encodes every m [1]-th frame of the image sequence. The actual processing sequence is similar to that of the flowchart of FIG. 5 and hence will not be described here any further.

The purpose of the first coding section 12 is to make the number of coded frames larger than that of the skip binary search section 10 (and hence the number of skip frames M smaller than that of the skip binary search section 10) in order to improve the accuracy of the estimated quantization step size. Therefore, the number of skip frames m [0] and the number of skip frames m [1] show a relationship of m [0]>m [1].

The first coding section 12 supplies the generated bit rate R ($\Delta_a$, m [1]) to the quantization step size forecasting section 13.

The quantization step size forecasting section 13 finely adjusts the quantization step size, using $\Delta_{skip}$, R ($\Delta_{skip}$, m [0]), $\Delta_{last}$ and R ($\Delta_{last}$, m [0]) supplied from the skip binary search section 10 and R ($\Delta_a$, m [1]) supplied from the first coding section 12. The quantization step size forecasting section 13 also utilizes the fact that the relationship between the quantization step size and the generated bit rate can be approximated by a straight line.

Figure 9:
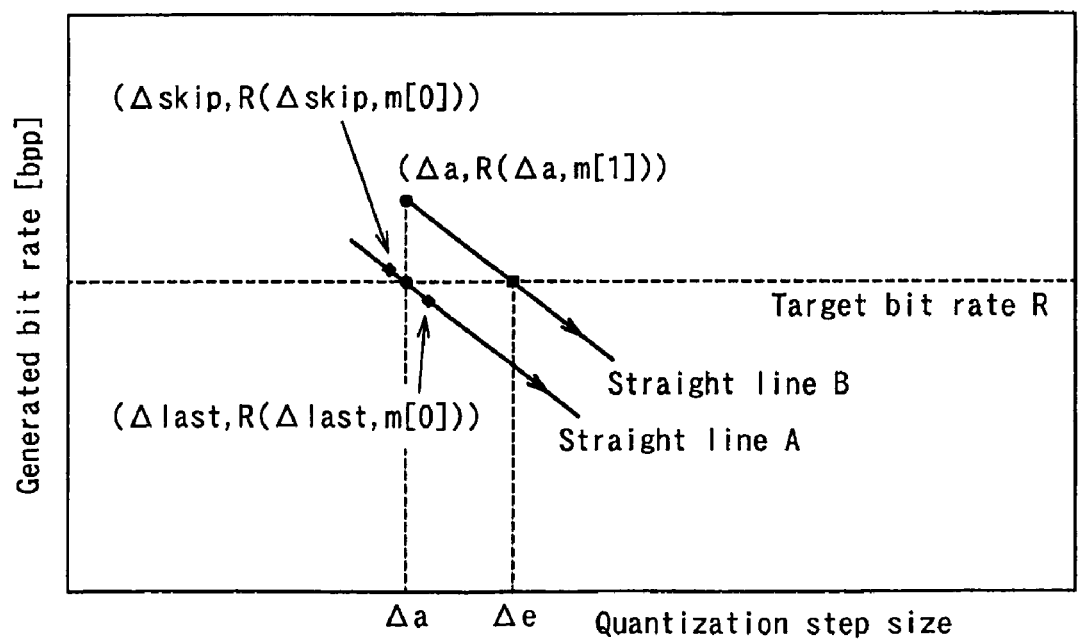
FIG. 9 is a schematic illustration of the operation of determining a quantization step size by the quantization step size forecasting section of the coding apparatus of FIG. 2.

More specifically, as shown in FIG. 9, the quantization step size forecasting section 13 assumes straight line A connecting point ($\Delta_{skip}$, R ($\Delta_{skip}$, m [0]) and point ($\Delta_{last}$, R ($\Delta_{last}$, m [0]) and straight line B that runs in parallel with the straight line A and passes through point ($\Delta_a$, R ($\Delta_a$, m [1])) and selects the value of the intersection of the straight line B and the target bit rate R on the horizontal axis as quantization step size $\Delta_e$. Then, the quantization step size forecasting section 13 supplies the quantization step size $\Delta_e$ to the second coding section 14.

The second coding section 14 encodes all the frames of the image sequence with the quantization step size $\Delta_e$ supplied from the quantization step size forecasting section 13. The actual processing sequence is similar to that of the flowchart of FIG. 5 when M=1 and hence will not be described here any further. The second coding section 14 outputs the code stream generated by the coding to the outside.

As described above, the coding apparatus 1 of the first embodiment does not encode all the frames repeatedly to search for an optimal quantization step size but determines the quantization step size $\Delta_a$ by coding every m [0]-th frame and approximating the relationship between the quantization step size and the generated bit rate by a straight line and then the quantization step size $\Delta_e$ by coding every m [1]-th (<m [0]) frame with the quantization step size $\Delta_a$ and by means of linear approximation. With the above-described arrangement, it is possible for the coding apparatus 1 to search for an optimal quantization step size at higher speed.

(Second Embodiment)

The processing sequence of the first embodiment is simple and the number of coded frames does not heavily rely on the image sequence to the end of the rate control operation. Then, however, it may sometimes not be possible to conduct an intended rate control operation particularly in the case of an image sequence where the image changes remarkably from frame to frame. Thus, the coding apparatus of the second embodiment is adapted to repeat the loop until getting to the target bit rate in order to ensure a desired accuracy level even in the case of an image sequence where rate control is difficult.

Figure 10:
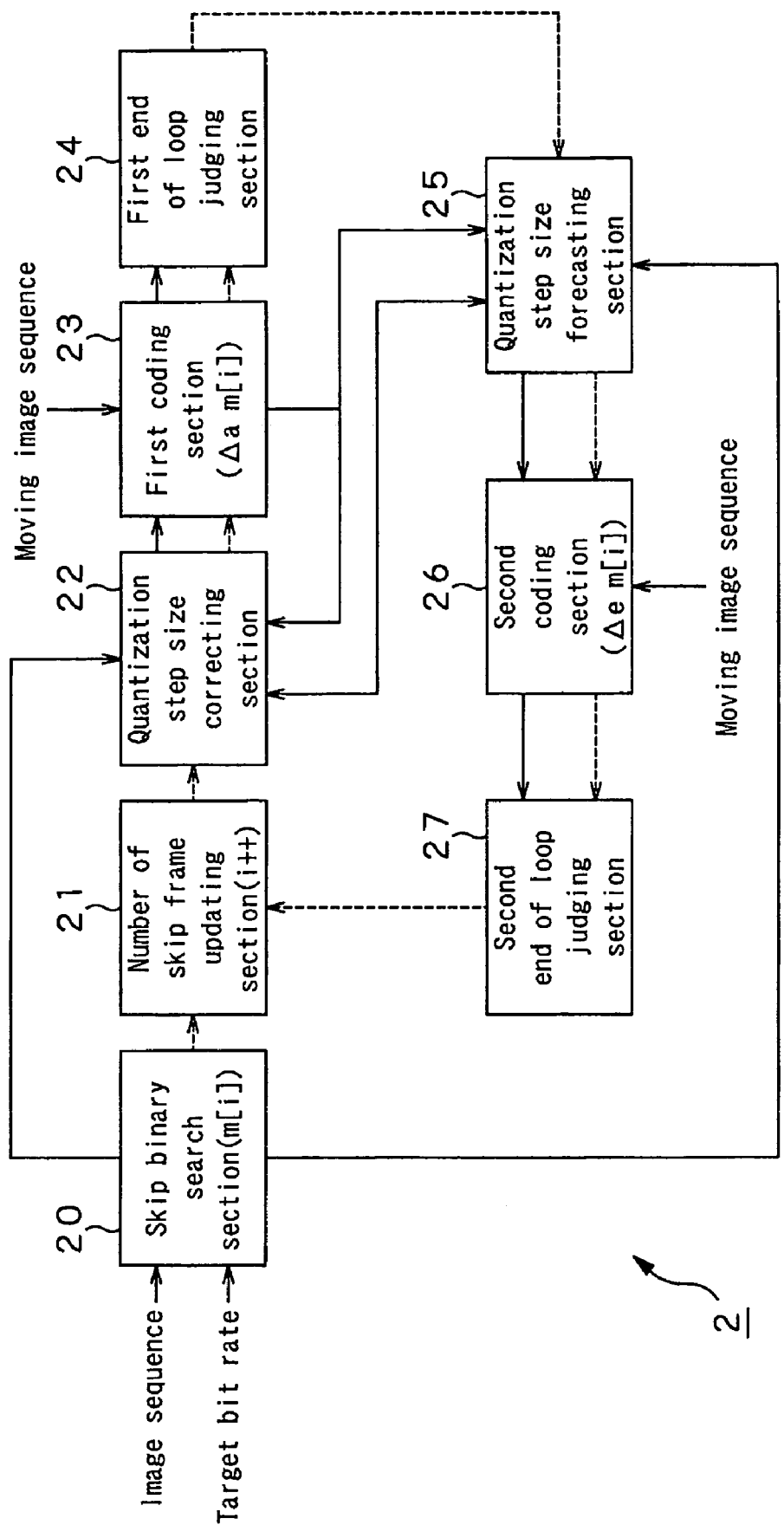
FIG. 10 is a schematic block diagram of a coding apparatus according to the second embodiment of the present invention, illustrating the configuration thereof.

FIG. 10 is a schematic block diagram of the coding apparatus according to the second embodiment of the present invention, illustrating the configuration thereof. As shown in FIG. 10, the coding apparatus 2 includes a skip binary search section 20, a number of skip frames updating section 21, a quantization step size correcting section 22, a first coding section 23, a first end of loop judging section 24, a quantization step size forecasting section 25, a second coding section 26 and a second end of loop judging section 27. FIG. 10 indicates the data flow in solid line and the process flow in broken line.

The skip binary search section 20 operates just like the above-described skip binary search section 10. More specifically, the skip binary search section 20 receives as input an image sequence of (n+1) frames (In [0] through In [n]) and a target bit rate (R [bpp]). Then, the skip binary search section 20 encodes the frames selected by using the number of skip frames M (=m [0]) of the image sequence and keeps on encoding, changing the quantization step size according to a binary search algorithm, to determine a quantization step size $\Delta_{skip}$ with which the generated bit rate is approximate to the target bit rate R. The skip binary search section 20 supplies the obtained quantization step size $\Delta_{skip}$, the generated bit rate R ($\Delta_{skip}$, m [0]) at that time, the quantization step size $\Delta_{last}$ in the immediately preceding loop and the generated bit rate R ($\Delta_{last}$, m [0]) at that time to the quantization step size correcting section 22 and the quantization step size forecasting section 25.

The number of skip frames updating section 21 updates the number of skip frames M from m [i] to m [i+1] (starting from i=0). The relationship of m [i]>m [i+1] holds true because the accuracy of estimating the quantization step size is raised by reducing the number of skip frames stepwise. Note, however, m [i+1] is equal to 1 when m [i] becomes equal to 1, which is the smallest value and m [i] may typically take values such as m [i]={120, 48, 6, 1, 1, 1, 1 ... }.

The quantization step size correcting section 22 finely adjusts the quantization step size. The quantization step size correcting section 22 operates just like the above-described quantization step size correcting section 11 for the first loop (i=1). More specifically, the quantization step size correcting section 22 computationally determines the quantization step size $\Delta_a$ by approximating the relationship between the quantization step size and the generated bit rate by means of a straight line, using $\Delta_{skip}$, R ($\Delta_{skip}$, m [0]), $\Delta_{last}$ and R ($\Delta_{last}$, m [0]) supplied from the skip binary search section 20. However, for the second loop and the subsequent loops (i≧2), the quantization step size correcting section 22 computationally determines the quantization step size $\Delta_a$ by approximating the relationship between the quantization step size and the generated bit rate by means of a straight line, using $\Delta_a$ and R ($\Delta_a$, m [i−1]) (which correspond to $\Delta_{last}$ and R ($\Delta_{last}$, m [0] listed above) supplied from the first coding section 23 and $\Delta_e$ and R ($\Delta_e$, m [i−1]) (which correspond to $\Delta_{skip}$ and R ($\Delta_{skip}$, m [0] listed above) supplied from the second coding section 26, although the correcting method is same.

The first coding section 23 encodes every m [i]-th frame of the image sequence, with the quantization step size $\Delta_a$ supplied from the quantization step size correcting section 22. The first coding section 23 supplies the generated bit rate R ($\Delta_a$, m [i]) to the first end of loop judging section 24.

The first end of loop judging section 24 uses that the number of skip frames m [i] is equal to 1, or m [i]=1, and the absolute value of the difference between the target bit rate R and the generated bit rate R ($\Delta_a$, m [i]) is smaller than the threshold value Th as conditions to be met for ending the loop and judges if these conditions are met or not. If the conditions for ending the loop are met, the code stream coded by the first coding section 23 is output to the outside to complete the processing operation. If, on the other hand, the conditions for ending the loop are not met, the processing operation proceeds to the quantization step size forecasting section 25 to continue.

The quantization step size forecasting section 25 finely adjusts the quantization step size. The quantization step size forecasting section 25 operates just like the above-described quantization step size forecasting section 13 for the first loop (i=1). More specifically, the quantization step size forecasting section 25 computationally determines the quantization step size $\Delta_e$, using $\Delta_{skip}$ and R ($\Delta_{skip}$, m [0]), $\Delta_{last}$ and R ($\Delta_{last}$, m [0]) supplied from the skip binary search section 20 and R ($\Delta_a$, m [i]) supplied from the first coding section 23. However, for the second loop and the subsequent loops (i≧2), the quantization step size forecasting section 25 computationally determines the quantization step size $\Delta_e$, using $\Delta_a$ and R ($\Delta_a$, m [i−1]) (which correspond to $\Delta_{last}$ and R ($\Delta_{last}$, m [0] listed above) supplied from the first coding section 23 and $\Delta_e$ and R ($\Delta_e$, m [i−1]) (which correspond to $\Delta_{skip}$ and R ($\Delta_{skip}$, m [0] listed above) supplied from the second coding section 26, although the correcting method is same.

The second coding section 26 encodes every m [i]-th frame of the image sequence, with the quantization step size $\Delta_e$ supplied from the quantization step size forecasting section 25. The second coding section 26 supplies the generated bit rate R ($\Delta_e$, m [i]) to the second end of loop judging section 27.

The second end of loop judging section 27 uses that the number of skip frames m [i] is equal to 1, or m [i]=1, and the absolute value of the difference between the generated bit rate R (Δe, m [i]) and the target bit rate R is smaller than the threshold value Th as conditions to be met for ending the loop and judges if these conditions are met or not. If the conditions for ending the loop are met, the code stream coded by the second coding section 26 is output to the outside to complete the processing operation. If, on the other hand, the conditions for ending the loop are not met, the processing operation returns to the number of skip frames updating section 21 to repeat the loop.

Figure 11:
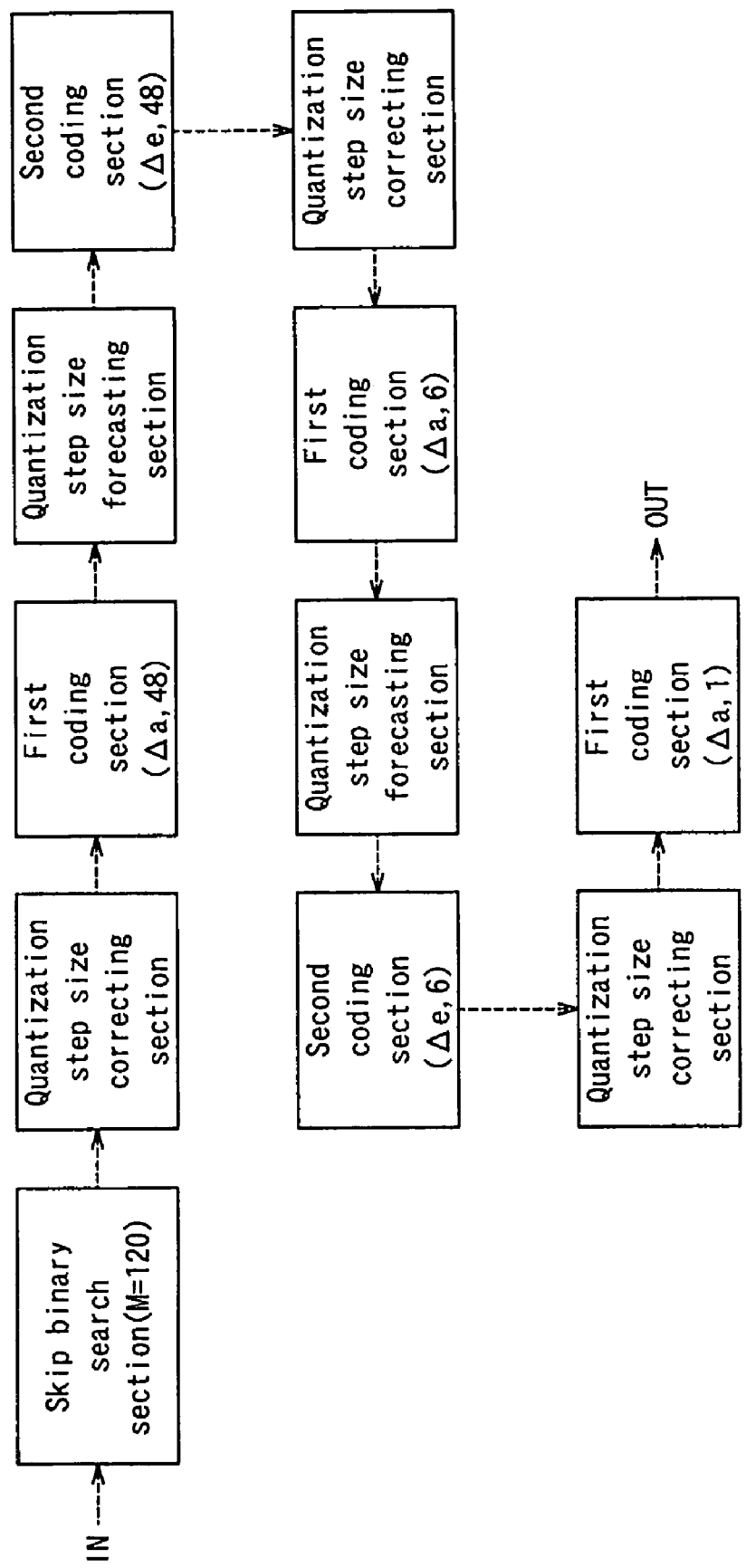
FIG. 11 is a schematic illustration of a typical processing sequence of the coding apparatus of FIG. 10.

If m [i]={120, 48, 6, 1, 1, 1, 1 ... }, the processing sequence of FIG. 11 applies in most cases except very few image sequences. More specifically, every 120-th frame of the image sequence is coded to determine the quantization step size $\Delta_a$ and then every 48-th frame of the image sequence is coded with the quantization step size $\Delta_a$ to determine the quantization step size $\Delta_e$. Then, every 48-th frame of the image sequence is coded with the quantization step size $\Delta_e$ to determine the quantization step size $\Delta_a$. Thereafter, every 6-th frame of the image sequence is coded with the quantization step size $\Delta_a$ to determine the quantization step size $\Delta_e$ and then every 6-th frame of the image sequence is coded with the quantization step size $\Delta_e$ to determine the quantization step size $\Delta_a$. Finally, all the frames of the image sequence are coded with the quantization step size $\Delta_a$.

Thus, with the coding apparatus 2 of the second embodiment, the loop is repeated until the conditions for ending the loop are met as judged by the first end of loop judging section 24 or the second end of loop judging section 27 to guarantee the accuracy of coding rate control.

While an image sequence is coded according to a bit plane coding system in the above description of the embodiments, the present invention is by no means limited thereto and the present invention can be applied to any other image coding system such as the MPEG (Moving Picture Experts Group) system that is adapted to intra-frame coding for all frames.

The series of processing steps of each of the above-described embodiments can be executed by software. Then, a computer program may be installed in the hardware dedicated to a computer, which may be a general purpose personal computer adapted to install various application programs, for the software directly or by way of a network or a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A coding apparatus for coding an image sequence of a plurality of frames, the apparatus comprising:

skip binary search means for coding a frame out of every first skip number of frames of the image sequence, while changing a quantization step size according to a binary search algorithm, and determining a quantization step size with which a generated bit rate is approximate to a target bit rate;

quantization step size correction means for determining the quantization step size good for achieving the target bit rate by using an approximate straight line expressing the relationship of the quantization step size determined by the skip binary search means and the generated bit rate, wherein the quantization step size correcting means connects a first point that indicates an outcome of the skip binary search and a second point of an immediately preceding loop by a straight line to determine an intersection of a straight line and the target bit rate and selects a value of an intersection on the horizontal axis as a corrected quantization step size;

first coding means for coding a frame out of every second skip number of frames of the image sequence with the quantization step size corrected by the quantization step size correction means;

quantization step size forecasting means for determining the quantization step size good for achieving the target bit rate by using the generated bit rate generated by the first coding means; and second coding means for coding all the frames of the image sequence with the quantization step size forecast by the quantization step size forecasting means.

2. The apparatus according to claim 1, wherein a second skip number of frames is smaller than the first skip number of frames.

3. The apparatus according to claim 1, wherein the quantization step size forecasting means determines the quantization step size to be used for achieving the target bit rate by using a straight line that passes a point expressed by the quantization step size corrected by the quantization step size correcting means and the generated bit rate generated by means of the quantization step size.

4. The apparatus according to claim 3, wherein the quantization step size forecasting means determines the quantization step size to be used for achieving the target bit rate by using a straight line that passes the point expressed by the quantization step size corrected by the quantization step size correcting means and the generated bit rate generated by means of the quantization step size and runs in parallel with the above approximate straight line.

5. The apparatus according to claim 1, further comprising:
number of skip frames updating means for updating the first number of skip frames by a step to make it equal to a second number of skip frames so as to reduce the first number of skip frames stepwise to 1.

6. The apparatus according to claim 5, further comprising:
first end of loop judging means adapted to use that the first number of skip frames is equal to 1 and the generated bit rate generated by the first coding means is approximate to the target bit rate as a first condition to be met for ending the loop and judges if the first loop ending condition is met or not;

the quantization step size forecasting means being adapted to determine the quantization step size for achieving the target bit rate by using the generated bit rate generated by the first coding means when the first loop ending condition is not met.

7. The apparatus according to 5, further comprising:
second end of loop judging means adapted to use that the first number of skip frames is equal to 1 and the generated bit rate generated by the second coding means is approximate to the target bit rate as a second condition to be met for ending the loop and judges if the second loop ending condition is met or not;

the number of skip frames updating means being adapted to update the first number of skip frames by a step when the second loop ending condition is not met.

8. A coding method of coding an image sequence of a plurality of frames, the method comprising:
a skip binary search step of coding a frame out of every first skip number of frames of the image sequence, while changing the quantization step size according to a binary search algorithm, and determining a quantization step size with which a generated bit rate is approximate to a target bit rate;

a quantization step size correction step of determining the quantization step size good for achieving the target bit rate by using an approximate straight line expressing the relationship of the quantization step size determined in the skip binary search step and the generated bit rate, wherein the quantization step size correcting step connects a first point that indicates an outcome of the skip binary search and a second point of an immediately preceding loop by a straight line to determine an intersection of a straight line and the target bit rate and selects a value of an intersection on the horizontal axis as a corrected quantization step size;

a first coding step of coding a frame out of every second skip number of frames of the image sequence with the quantization step size corrected in the quantization step size correction step;

a quantization step size forecasting step of determining the quantization step size good for achieving the target bit rate by using the generated bit rate generated in the first coding step; and a second coding step of coding all the frames of the image sequence with the quantization step size forecast in the quantization step size forecasting step.

9. A non-transitory computer readable medium for recording a program for causing a computer to execute a process of coding an image sequence of a plurality of frames, the process comprising:
a skip binary search step of coding a frame out of every first skip number of frames of the image sequence, while changing a quantization step size according to a binary search algorithm, and determining a quantization step size with which a generated bit rate is approximate to a target bit rate;

a quantization step size correction step of determining the quantization step size good for achieving the target bit rate by using an approximate straight line expressing the relationship of the quantization step size determined in the skip binary search step and the generated bit rate, wherein the quantization step size correcting step connects a first point that indicates an outcome of the skip binary search and a second point of an immediately preceding loop by a straight line to determine an intersection of a straight line and the target bit rate and selects a value of an intersection on the horizontal axis as a corrected quantization step size;

a first coding step of coding a frame out of every second skip number of frames of the image sequence with the quantization step size corrected in the quantization step size correction step;

a quantization step size forecasting step of determining the quantization step size good for achieving the target bit rate by using the generated bit rate generated in the first coding step; and a second coding step of coding all the frames of the image sequence with the quantization step size forecast in the quantization step size forecasting step.

10. A non-transitory computer readable medium comprising a recording medium recording a program for causing a computer to execute a process of coding an image sequence of a plurality of frames, the process comprising:

a skip binary search step of coding a frame out of every first skip number of frames of the image sequence, while changing a quantization step size according to a binary search algorithm, and determining a quantization step size with which a generated bit rate is approximate to a target bit rate;

a quantization step size correction step of determining the quantization step size good for achieving the target bit rate by using an approximate straight line expressing the relationship of the quantization step size determined in the skip binary search step and the generated bit rate, wherein the quantization step size correcting step connects a first point that indicates an outcome of the skip binary search and a second point of an immediately preceding loop by a straight line to determine an intersection of a straight line and the target bit rate and selects a value of an intersection on the horizontal axis as a corrected quantization step size;

a first coding step of coding a frame out of every second skip number of frames of the image sequence with the quantization step size corrected in the quantization step size correction step;

a quantization step size forecasting step of determining the quantization step size good for achieving the target bit rate by using the generated bit rate generated in the first coding step; and a second coding step of coding all the frames of the image sequence with the quantization step size forecast in the quantization step size forecasting step.

11. A coding apparatus for coding an image sequence of a plurality of frames, the apparatus comprising:

a skip binary search section that codes a frame out of every first skip number of frames of the image sequence, while changing a quantization step size according to a binary search algorithm, and determines a quantization step size with which a generated bit rate is approximate to a target bit rate;

a quantization step size correction section that determines the quantization step size good for achieving the target bit rate by using an approximate straight line expressing the relationship of the quantization step size determined by the skip binary search section and the generated bit rate, wherein the quantization step size correcting section connects a first point that indicates an outcome of the skip binary search and a second point of an immediately preceding loop by a straight line to determine an intersection of a straight line and the target bit rate and selects a value of an intersection on the horizontal axis as a corrected quantization step size;

a first coding section that codes a frame out of every second skip number of frames of the image sequence with the quantization step size corrected by the quantization step size correction section;

a quantization step size forecasting section that determines the quantization step size good for achieving the target bit rate by using the generated bit rate generated by the first coding section; and a second coding section that codes all the frames of the image sequence with the quantization step size forecast by the quantization step size forecasting section.

* * * * *